(12) United States Patent
Schuengel

(10) Patent No.: US 11,381,376 B2
(45) Date of Patent: Jul. 5, 2022

(54) METHOD FOR SYNCHRONIZING NETWORKS

(71) Applicant: Robert Bosch GmbH, Stuttgart (DE)

(72) Inventor: Maximilian Schuengel, Leipheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/198,595

(22) Filed: Mar. 11, 2021

(65) Prior Publication Data

US 2021/0314132 A1   Oct. 7, 2021

(30) Foreign Application Priority Data

Apr. 7, 2020 (DE) .................... 10 2020 204 458.9

(51) Int. Cl.
*H04L 7/00* (2006.01)

(52) U.S. Cl.
CPC .......... *H04L 7/0012* (2013.01); *H04L 7/0025* (2013.01); *H04L 7/0079* (2013.01); *H04L 7/0091* (2013.01)

(58) Field of Classification Search
CPC ... H04L 7/0012; H04L 7/0091; H04L 7/0079; H04L 7/0025; H04L 69/08; H04L 1/04; H04W 88/08
USPC ................. 375/356, 354, 371, 373
See application file for complete search history.

(56) References Cited

U.S. PATENT DOCUMENTS

| | | | |
|---|---|---|---|
| 2011/0080963 A1* | 4/2011 | Kim | H04L 1/04 375/260 |
| 2016/0135112 A1* | 5/2016 | Lin | H04W 88/08 370/329 |
| 2017/0359139 A1* | 12/2017 | Butterworth | H04L 69/08 |

\* cited by examiner

*Primary Examiner* — Phuong Phu
(74) *Attorney, Agent, or Firm* — Maginot, Moore & Beck LLP

(57) ABSTRACT

A method for synchronizing networks is disclosed. A first wired communication system having a first time base is set up in a first network. A second wired communication system having a second time base is set up in a second network. The first network and the second network are connected to a wireless communication system via a first translation unit and a second translation unit, respectively. The first translation unit and the second translation unit are synchronized to one another according to a third time base of the wireless communication system independently of the first time base and the second time base. A third synchronization message is transmitted from the first translation unit to the second translation unit. A transmission time for the third synchronization message in the third time base is determined and is used to synchronize the second time base to the first time base.

20 Claims, 3 Drawing Sheets

METHOD FOR SYNCHRONIZING NETWORKS

This application claims priority under 35 U.S.C. § 119 to application no. DE 10 2020 204 458.9, filed on Apr. 7, 2020 in Germany, the disclosure of which is incorporated herein by reference in its entirety.

TECHNICAL FIELD

The present disclosure concerns multiple methods for synchronizing networks and also a computing unit, a system of networks and a dataset for implementing the latter.

BACKGROUND

In automation engineering and industrial control engineering, it is customary to connect components of a machine or installation, in particular control units and field devices, such as e.g. electrical controllers, drive controllers, I/O devices, etc., for data transmission purposes. So that for example movements of different assemblies of the machine can take place synchronously and in a manner matched to one another, the individual machine components networked to one another usually need to have a common time base. For this purpose, it is necessary to synchronize the individual machine components, or the clocks thereof. By way of example, wired, realtime-compatible fieldbus networks, which are often based on Ethernet, e.g. Sercos 2, Sercos III, EtherCAT, Profinet, Ethernet/IP, Profibus, etc., are used for such networking of industrial machines or machine components.

A common time base in a wired network of this kind can be established for example by means of what is known as the "Precision Time Protocol" (PTP), as part of which a multiplicity of synchronization messages (e.g. Sync, Follow Up, Delay Request, Delay Response, etc.) are interchanged between a master and a slave in order to detect and possibly compensate for a delay between the master clock and the slave clock.

Wired networks of this kind are not usually focussed on mobility and scalability and usually require fixed planning. To increase mobility and scalability, the "Industry 4.0" concept is now common for the networking of machines, for example in the field of automation engineering. This is intended to be understood to mean the networking of machines or installations and in particular also the connection thereof to the Internet or the Internet of Things (known as IoT). Networked devices in this case can be sensors and security cameras through to vehicles and production machines. By way of example, there is the possibility of connecting a machine to the Internet via mobile radio networks and of connecting it to other machines, for example.

In such cases, wired local area networks that for example each have realtime-compatible fieldbus networks set up in them can be networked to one another via a wireless realtime-compatible network, for example a mobile radio network. So that a data transmission between the individual components networked to one another can take place in real time in such cases too, it is important for these different networks to each have the same time notation and to be able to be synchronized to one another.

SUMMARY

Against this background, multiple associated methods for synchronizing networks and also a computing unit, a system of networks and a dataset for implementing the latter are disclosed. Advantageous refinements are the subject of the embodiments and of the description that follows.

A first wired communication system having a first time base is set up in a first network and a second wired communication system having a second time base is set up in a second network. The first network is connected to a wireless communication system via a first translation unit and the second network is connected to the wireless communication system via a second translation unit. The first translation unit and the second translation unit are synchronized to one another according to a third time base of the wireless communication system independently of the first time base and the second time base.

In particular, the first and second translation units each act as an interface between the respective network, or the respective wired communication system, and the wireless communication system. The first translation unit furthermore acts in particular as interface between the first time base of the first network and the third time base of the wireless network. Accordingly, the second translation unit expediently acts as interface between the third time base and the second time base of the second network.

The present method involves these two networks being synchronized to one another via the wireless communication system, or the second time base of the second network is synchronized to the first time base of the first network via the wireless network. Without restricting the generality, it will be assumed that there is provision in the first network for a global timer, or a master clock, that is intended to be used to synchronize network subscribers in the first and second networks. To this end, a third synchronization message is sent from the first translation unit to the second translation unit and a transmission time for the third synchronization message from the first translation unit to the second translation unit in the third time base is determined and is taken into consideration for the synchronization of the second time base to the first time base. This can provide a very simple way of taking into consideration the time delay as a result of the transmission via the wireless communication systems.

In particular, the transmission time for the third synchronization message from the first translation unit to the second translation unit in the third time base is determined by determining, in the third time base, the time of reception of a first synchronization message from the first network at the first translation unit and determining, in the third time base, the time of sending of a second synchronization message from the second translation unit to the second network. This makes it possible to take into consideration the total time delay outside the first and second time bases for the synchronization without these time bases needing to be synchronized to the third time base. Expediently, however, the time bases involved have the same units, or are convertible into one another in a known manner, i.e. the difference in the third time base needs to be convertible into a difference in the first and second time bases.

Particularly expediently, these first and second synchronization messages can be what are known as Sync messages. They can therefore be based on a conventional synchronization mechanism such as the "Precision Time Protocol" (PTP), in order to synchronize the network subscribers of the first and second networks to the timer of the first network. In order to allow this synchronization via the wireless communication system, a third synchronization message provided specifically for this purpose is proposed that is transmitted from the first translation unit to the second translation unit via the wireless communication system and that contains all the necessary information required to synchronize the second network, or the individual networks subscribers thereof, to the global timer of the first network.

In contrast to conventional synchronization mechanisms, such as for example the "Precision Time Protocol" (PTP), the synchronization via the wireless communication system within the context of the present methods is effected only by means of one message, which is referred to as third synchronization message here. According to conventional synchronization mechanisms, synchronization usually requires at least two messages, e.g. Sync, Follow Up, Delay Request, Delay Response, etc. The synchronization-relevant message therefore allows low-complexity synchronization of two wired networks via a wireless network. A total size of the third synchronization message is particularly expediently smaller than the total size of the messages sent according to conventional synchronization mechanisms. The number of data that need to be sent for synchronization via the wireless communication system, and hence the transmission resources required for synchronization, can be reduced. Furthermore, complexity for scheduling can be reduced and synchronization is less susceptible to the loss of data packets. The third synchronization message is preferably produced on the basis of a dataset according to the disclosure. This message, or this dataset, comprises a field for a header and fields for the individual synchronization-relevant data.

The present disclosure is based on the concept of transmitting the information needed for the time synchronization, which information is interchanged as part of multiple messages in the wired communication systems, in a manner bundled in a single synchronization-relevant message for the time synchronization via the wireless communication system and of using an existing synchronization in the wireless communication system. Within the context of the present disclosure, there is provision in the individual networks for appropriate mechanisms for coupling and decoupling the third synchronization message, or the synchronization-relevant data contained therein, that take place transparently for the other subscribers, i.e. the other subscribers do not need to know of the existence of said mechanisms. In particular, the first and second translation units are appropriately configured and designed for this coupling and decoupling.

Since the first and second translation units furthermore have the same time notation according to the third time base, this coupling and decoupling is effected according to the same time notation. The translation units are used in particular for translating or conveying the synchronization-relevant data between the first and second networks. A translation time offset, in particular a time interval needed for transmitting the synchronization-relevant data via the translation units, is determined in the third time base and is particularly expediently a relevant time offset independently of the first and second time bases.

Advantageously, the third synchronization message comprises not only the time of reception of the first synchronization message in the third time base but also further synchronization-relevant data such as e.g. a time of transmission of the first synchronization message in the first time base and/or a frequency shift in the first time base between the first translation unit and the timer of the first network and/or a transmission delay in the first time base in the first network and/or a first correction field value in the first time base for correcting a time delay between the time of transmission of the first synchronization message in the first time base and the time of reception of the first synchronization message in the first time base.

The transmission delay in the first time base is preferably a mean transmission delay in the first network. In particular, the transmission delay therefore concerns the delay in the transmission of the first synchronization messages in the first network from the timer to the first translation unit.

Advantageously, the third synchronization message comprises a header and also a respective field for each of the individual synchronization-relevant data. This message has a smaller total size than the sum of a Sync message and a FollowUp message, requires less processing complexity and can be communicated in a resource-saving manner.

In the first network a first portion of the synchronization-relevant data is communicated by the first synchronization messages (or associated FollowUp messages) and a second portion is determined by the first translation unit following reception of the synchronization messages. In the second network the synchronization-relevant data are used to generate second synchronization messages (and associated FollowUp messages), which come from the first network from the point of view of the receiver.

According to one advantageous embodiment, the second translation unit, for the purpose of communication to the second network, takes the synchronization-relevant data as a basis for determining a second correction field value for correcting a total delay from the time of transmission of the first synchronization message to a time of reception of the second synchronization message. In particular, the above-described difference between time of reception and time of sending in the third time base can influence this second correction field value, as a result of which subsequent subscribers in the second network can use their conventional synchronization mechanisms and do not need to know the transmission structure. By using this second correction field value and using the time of transmission of the first message, the second translation unit can, in particular, synchronize the network subscribers of the second network to the global timer of the first network.

Particularly advantageously, the disclosure allows machines or installations to be networked to one another and in particular connected to the Internet or the Internet of Things (known as IoT) as part of what is known as "Industry 4.0". Components of the machines, in particular control units and field devices, such as e.g. electrical controllers, drive controllers, I/O devices, etc., can each be connected to one another in the first and second networks. The wireless communication system, in particular a realtime-compatible Internet connection, or a realtime-compatible mobile radio network, can network these different machines, or the wired realtime-compatible communication systems thereof, directly to one another.

The first and second communication systems are particularly expediently each a realtime-compatible communication system that allows an applicable realtime condition to be satisfied in the respective network and data packets transmitted in the respective network to be guaranteed to reach or have reached the desired subscriber at a definable time, or within a definable period of time. For this purpose, appropriate mechanisms, or protocols, are implemented in the respective communication system, so that a predefined realtime condition can be complied with.

Realtime mechanisms of wired communication systems in automation engineering and industrial control engineering, for example of realtime-compatible fieldbuses, differ in particular in some cases significantly from realtime mechanisms of wireless communication systems, in particular wireless, realtime-compatible mobile radio networks, which means that it is conventionally not readily possible to connect realtime-critical functions of machines wirelessly via a mobile radio network. The present disclosure now allows this; this means that machines are expediently connected to further machines via a realtime-compatible mobile radio network and can communicate in real time.

Preferably, the first wired communication system and the second wired communication system are each based on Ethernet and/or on IEEE802 standards and/or on TSN standards. These realtime-compatible communication systems are each expediently used for networking components of a machine in automation engineering. Expediently, the first and second wired realtime-compatible communication systems are each an Ethernet-based realtime-compatible fieldbus, e.g. Sercos III, EtherCAT, Profinet, Ethernet/IP, etc. IEEE802 contains a series of norms or standards in the field of, in particular wired, local area networks, in particular Ethernet networks. "Time Sensitive Networking" (TSN) represents a series of standards or norms that are concerned inter alia with the synchronization of network subscribers in a network, in particular in order to meet realtime requirements, in particular for data transmission via Ethernet. TSN standards are becoming increasingly significant as part of Industry 4.0.

Preferably, the wireless communication system is a realtime-compatible mobile radio network and/or is based on 5G standards. After UMTS (3G) and LTE (4G), 5G is the fifth generation of what are known as 'next-generation mobile networks' (NGMN for short), a project by mobile radio companies and mobile radio suppliers for developing mobile radio generations. 5G is based on its direct predecessor 4G, but has significant improvements in comparison therewith, in particular a significantly improved realtime response.

According to a particularly advantageous refinement of the disclosure, the first wired communication system and the second wired realtime-compatible communication system are each based on TSN standards and the wireless realtime-compatible communication system is based on 5G standards. Communication systems based on TSN and 5G standards each have specific realtime mechanisms, in particular QoS mechanisms, that allow data transmission in real time, but in some cases differ significantly from one another. The present disclosure provides the opportunity to translate the realtime mechanisms into one another according to TSN and 5G standards, as a result of which it is particularly advantageously possible for realtime properties between an Ethernet-based realtime system and a 5G mobile radio system to be made compatible with one another. It is therefore particularly advantageously rendered possible to connect machines to a network based on Ethernet or TSN standards via a 5G mobile radio network in real time, in particular as part of "Industry 4.0".

The disclosure is advantageously suitable for a wide range of machines and applications, for example for tunnel boring machines, hydraulic punches/presses, general automation systems, semiconductor handling, robotics, etc. Advantageously, the disclosure is suitable for machine tools, such as for example a welding system, a screwing system, a wire saw or a milling machine, for web processing machines, such as e.g. a printing press, a newspaper printing press, an intaglio printing press or screen printing press, an inline flexographic printing press or a packaging machine, or else for (belt) installations for manufacturing an automobile or for manufacturing components of an automobile (e.g. internal combustion engines or control units).

A computing unit according to the disclosure is designed, in particular by programming, to perform a method according to the disclosure. In particular, such a computing unit is provided as a corresponding translation unit in a respective network and can be in the form of a router, for example.

The implementation of a method according to the disclosure in the form of a computer program or computer program product with program code for performing all of the method steps is also advantageous, because it gives rise to particularly low costs, in particular when an executing control unit is also used for other tasks and is therefore present anyway. Suitable data carriers for providing the computer program are in particular magnetic, optical and electrical memories, such as e.g. hard disks, flash memories, EEPROMs, DVDs, and so on. Download of a program via computer networks (Internet, intranet, etc.) is also possible.

Further advantages and refinements of the disclosure will emerge from the description and the accompanying drawing.

It goes without saying that the features cited above and those yet to be explained below are able to be used not only in the respectively indicated combination but also in other combinations or on their own without departing from the scope of the present disclosure.

BRIEF DESCRIPTION OF THE DRAWINGS

The disclosure is schematically depicted in the drawing on the basis of exemplary embodiments and is described in detail below with reference to the drawings.

DETAILED DESCRIPTION

Figure 1:
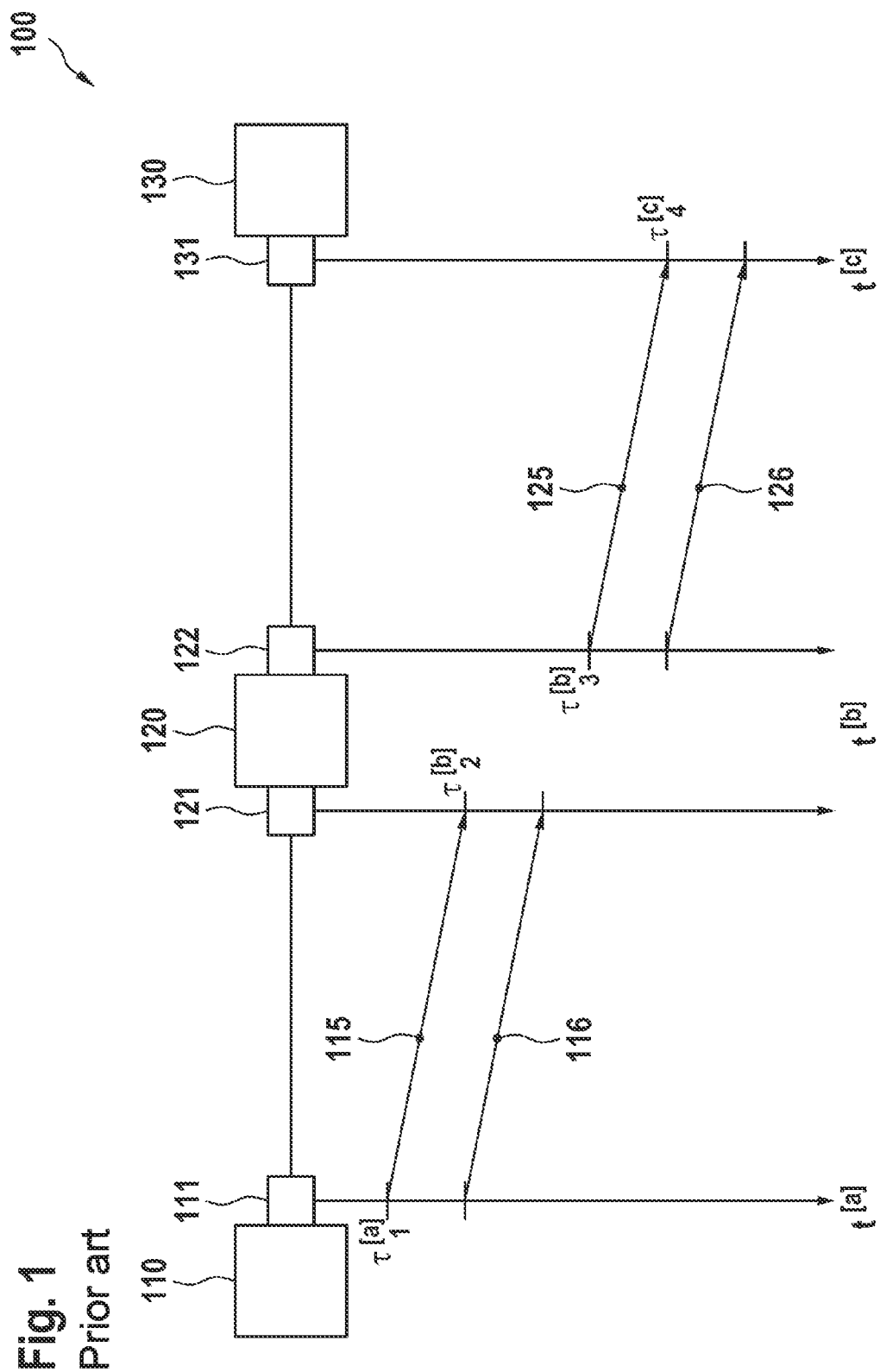
FIG. 1 schematically shows a network based on the prior art.

FIG. 1 schematically depicts a network based on the prior art and denotes it by 100. The network 100 has a multiplicity of distribution nodes 110, 120, 130, to each of which a multiplicity of network subscribers can be connected.

The individual nodes and therefore the network subscribers are networked to one another via a wired realtime-compatible communication system that is based on Ethernet, on IEEE802 standards and furthermore on TSN standards.

The node 110 comprises a global timer, or a master clock, 111, to which all of the subscribers of the network 100 are synchronized in order to have a common time base and in order to be able to communicate in real time.

The nodes 110, 120, 130 are synchronized in the network 100 in a conventional manner in accordance with what is known as the "Precision Time Protocol" (PTP) using what are known as Sync and FollowUp messages.

Communication of different synchronization messages 115, 116 first synchronizes a slave clock 121 of the second node 120 to the master clock 111 of the first node 110. The second node 120, acting as a master 122, in turn uses synchronization messages 125, 126 to synchronize an internal slave clock 131 of the third node 130 to its clock 122. The time bases, or time notations, of the individual nodes 110, 120, 130 are denoted by $t^{[a]}$, $t^{[b]}$ and $t^{[c]}$ in FIG. 1, the time base being in square parentheses.

For this purpose, the first node 110 transmits a Sync message 115 to the node 120 at a first time $\tau_1^{[a]}$, the latter node receiving this message 115 at a second time $\tau_2^{[b]}$. The first node 110 furthermore produces a timestamp in reference to the first time $\tau_1^{[a]}$ in its time base $t^{[a]}$ at which it sent the first Sync message 115. Furthermore, the second node 120 produces a timestamp in reference to the time $\tau_2^{[b]}$ in its time base $t^{[b]}$ at which it received the first Sync message 115. As soon as possible, the first node 110 transmits a FollowUp message 116 comprising this timestamp in reference to the time $\tau_1$ to the second node 120.

By using the two timestamps and a mean transmission delay $$\bar{t}_{pd,a\to b}^{[a]}$$

in the first network 100 from the first node 110 to the second node 120 in the time base $t^{[a]}$, the second node 120 can determine the global time of the node 110, in particular by using a time offset or offset $\Delta t^{[b]}$ of its internal clock 121 in its time base $t^{[b]}$ in comparison with the clock 111 of the node 110, for example according to the following formula:

$$\Delta t^{[b]} = \tau_2^{[b]} - f_{rr}^{[b]} \cdot (\tau_1^{[a]} + \bar{t}_{pd,a\to b}^{[a]})$$

$f_{rr}^{[b]}$ denotes a frequency shift between the local clock 121 of the second node 120 and the global clock 111 of the first node 110. This frequency shift can be determined for example by further Sync and FollowUp messages, in particular according to the standards IEEE802.1AS-Rev and IEEE1588-2008.

Following the synchronization of the second node 120 to the first node 110, the slave clock 131 of the third node 130 is synchronized to the second node 120 acting as master 122 toward said slave clock.

For this purpose, the second node 120 transmits a Sync message 125 to the third node 130 at a third time $\tau_3^{[b]}$, said third node receiving this message 125 at a fourth time $\tau_4^{[c]}$. The second node 120 produces a timestamp in reference to the third time $\tau_3^{[b]}$ in its time notation $t^{[b]}$. By using this timestamp, the second node 120 furthermore determines a correction field value $t_{cf,b}^{[a]}$ in the time base $t^{[a]}$ according to the following formula:

$$t_{cf,b}^{[a]} = f_{rr}^{[b]} \cdot (\tau_3^{[b]} - \tau_2^{[b]}) + \bar{t}_{pd,a\to b}^{[a]}$$

The correction field value concerns in particular a correction on the basis of a processing or delay time between reception of the first Sync message 115 and transmission of the second Sync message 125. The second node 120 then transmits a second FollowUp message 126 comprising the timestamp with reference to the time, the correction field value $t_{cf,b}^{[a]}$ and the frequency shift $f_{rr}^{[b]}$ to the third node 130.

The third node 130 receives the second Sync message 125 at the time $\tau_4^{[c]}$ and produces a corresponding timestamp in its time notation $t^{[c]}$. After receiving the second FollowUp message, the third node 130 can be synchronized to the global timer 110. For this purpose, the offset $\Delta t^{[c]}$ of the internal clock 131 of the third node compared to the master clock 111 can be determined according to the following formula:

$$\Delta t^{[c]} = \tau_4^{[c]} - f_{rr}^{[c]} \cdot (\tau_1^{[a]} + \bar{t}_{pd,b\to c}^{[a]} + t_{cf,b}^{[a]})$$

Here, $f_{rr}^{[c]}$ denotes the frequency shift of the third node 130 and $$\bar{t}_{pd,b\to c}^{[a]}$$

denotes the mean transmission delay between the second node 120 and the third node 130.

Figure 2:
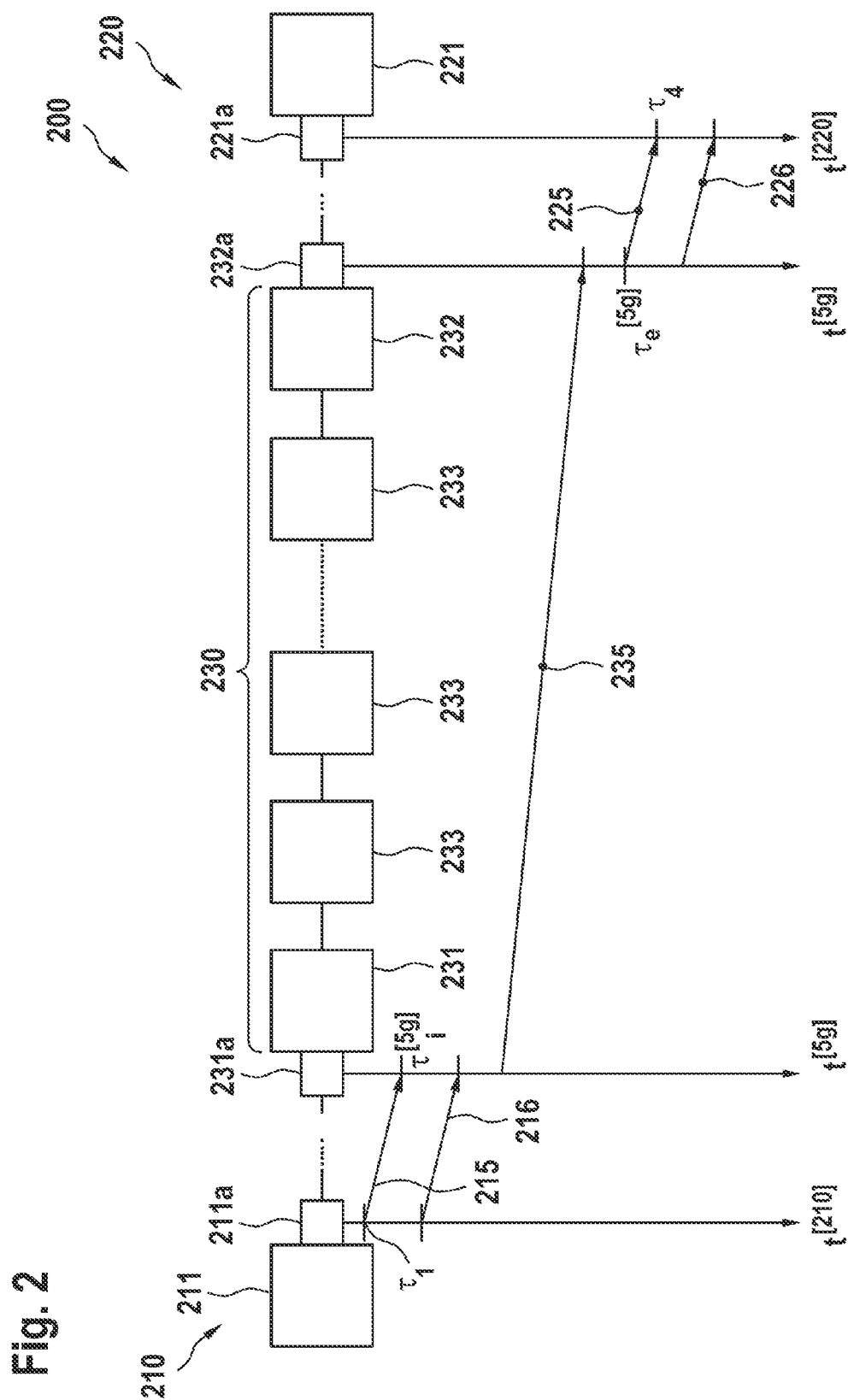
FIG. 2 schematically shows a preferred refinement of a system of networks according to the disclosure that is designed to perform a preferred embodiment of a method according to the disclosure.

FIG. 2 schematically shows a preferred refinement of a system 200 of networks according to the disclosure that are synchronized according to a preferred embodiment of a method according to the disclosure.

A first wired realtime-compatible communication system having a first time base $t^{[210]}$ is set up in a first network 210 and a second wired realtime-compatible communication system having a second time base $t^{[220]}$ is set up in a second network 220.

These two wired realtime-compatible communication systems are each based on Ethernet, on IEEE802 standards and furthermore preferably each on TSN standards. By way of example, the communication systems can each be in the form of an Ethernet-based realtime-compatible fieldbus, e.g. Sercos III, EtherCAT, Profinet, Ethernet/IP, etc.

By way of example, the first and second networks 210, 220 each network components of a machine to one another as part of automation engineering and industrial control engineering, for example in each case control units, actuators, sensors, etc. As part of "Industry 4.0", the two networks 210, 220 and therefore the respective machines are connected to one another via a wireless realtime-compatible communication system 230. This wireless realtime-compatible communication system 230 is based on 5G standards and is in the form of a realtime-compatible mobile radio network, or a 5G mobile radio network.

The first network 210 is connected to the wireless network 230 via a first translation unit 231 and the second network 220 is connected to the wireless network via a second translation unit 232. The first translation unit 231 and the second translation unit 232 are synchronized to one another according to a third time base $t^{[5g]}$ of the wireless communication system 230 independently of the first time base $t^{[210]}$ and the second time base $t^{[220]}$. These translation units 231, 232 are used in particular as appropriate interfaces between the time bases $t^{[210]}$ and $t^{[220]}$ of the first and second networks 210, 220 and the third time base $t^{[5g]}$ of the wireless communication system 230. The wireless network 230 expediently comprises further components 233 in order to form a 5G bridge between the networks 210, 220.

Furthermore, an internal clock 231a of the first translation unit 231 can be connected as slave to the first time base $t^{[210]}$ of the first network 210. Accordingly, an internal clock 232a of the second translation unit 232 can be connected to the second time base $t^{[220]}$ of the second network 220.

In order to allow realtime-compatible data transmission between the TSN networks 210 and 220 via the 5G mobile radio network 230, it is important for these networks 210, 220 to each have the same time notation and to be able to be synchronized to one another via the 5G mobile radio network 230.

Synchronization in accordance with the "Precision Time Protocol" (PTP) can take place within each of the first and second networks 210, 220, as explained above with reference to FIG. 1. For this purpose, individual nodes, or network subscribers, in the first and second networks 210, 220 can each be synchronized by the transmission and reception of Sync and FollowUp messages. Network subscribers, or nodes, in the first network 210 are synchronized to a global timer 211, or a master clock 211a, in accordance with the "Precision Time Protocol" (PTP). The network subscribers, or nodes, in the second network 220 are also intended to be synchronized to this global timer 211 of the first network 210.

For this purpose, the system 200 is designed to perform a preferred embodiment of a method according to the disclosure. In the course of said method, the first translation unit 231 receives synchronization messages 215, 216 in accordance with the PTP of the timer 211 of the first network 210. The first translation unit 231 then produces a third synchronization message 235, which comprises synchronization-relevant data for synchronizing the second network 220 to the global timer 211 of the first network 210. This third synchronization message 235 is communicated from the first translation unit 231 via the 5G mobile radio network 230 to the second translation unit 232, which uses this received message 235 to synchronize the second network 220, or internal clocks 221a of network subscribers 221 in the second network 220, to the timer 211 of the first network 210.

First, the first translation unit 231 receives a first synchronization message 215, here a Sync message in accordance with PTP, and additionally a FollowUp message 216, from the timer 211 of the first network 210, for example.

The first translation unit 231 uses the received synchronization messages 215, 216 to determine synchronization-relevant data. Advantageously, these synchronization-relevant data that are determined are a transmission timestamp, a reception timestamp, a frequency shift, a mean transmission delay and a first correction field value.

The transmission timestamp concerns a time of transmission $\tau_1$ at which the first Sync message was sent by the timer 211 of the first network 210, in particular in the time notation $t^{[210]}$ thereof, or in the first time base $t^{[210]}$. This first timestamp is in particular communicated with the first FollowUp message 216.

The reception timestamp concerns a time of reception at which the first Sync message was received by the first translation unit 231, in particular in the time notation $t^{[5g]}$ thereof, or in the third time base $t^{[5g]}$.

The frequency shift $f_{rr}^{[b]}$ concerns in particular a frequency offset between the internal clock 231a of the first translation unit 231 and the global clock 211a of the timer 211, in particular in the first time base $t^{[210]}$.

The mean transmission delay $$\bar{t}_{pd, a \to b}^{[a]}$$

concerns in particular the mean transmission time for the synchronization messages 215, 216 between timer 211 and the first translation unit 231 in the first network 210, in particular in the first time base $t^{[210]}$.

The first correction field value $t_{cf,a}^{[a]}$ concerns in particular a correction of a time delay between the time of transmission $\tau_1$ of the first synchronization message and the time of reception of the first synchronization message, in particular in the first time base $t^{[210]}$.

In particular, the first translation unit 231, after receiving the first Sync message 215, determines the reception timestamp in the third time base $t^{[5g]}$ as a synchronization-relevant datum. After receiving the first FollowUp message 216, the first translation unit 231 determines the remaining aforementioned synchronization-relevant data, or takes said data from the FollowUp message 216.

On the basis of these synchronization-relevant data, the first translation unit 231 produces the third synchronization message 235 and communicates it via the wireless communication system 230 to the second translation unit 232 of the second network 220 for the purpose of synchronization to the timer 211 of the first network 210.

The second translation unit 232 receives the third synchronization message 235. The second translation unit 232 then takes the synchronization-relevant data for synchronizing the second time base $t^{[220]}$ to the first time base $t^{[210]}$ as a basis for transmitting a second synchronization message 225, here a Sync message in accordance with PTP, and additionally a FollowUp message 226 in the second network 220. This Sync message 225 is received by the network subscriber 221 at a time $\tau_4$.

After transmitting the second Sync message 225, the second translation unit 232 determines, in its time notation $t^{[5g]}$, a starting timestamp for the time of transmission of this message 225. On the basis of the time of transmission and the synchronization-relevant data, the second translation unit 232 determines a second correction field value according to the following formula:

$$t_{cf,b}^{[a]} = t_{cf,a}^{[a]} + ((\tau_e^{[5g]} - \tau_i^{[5g]}) + \bar{t}_{pd,a \to b}^{[a]}) \cdot f_{rr}^{[b]}$$

This second correction field value contains in particular a total processing or delay time, from the time of transmission $\tau_1$ of the first synchronization message to the time of reception $\tau_4$ of the second synchronization message, and contains in particular a processing or delay time that the wireless communication system 230 needs for transmitting the synchronization-relevant data between the first and second networks 210, 220. Particularly advantageously, this second correction field value is dependent on a difference between the starting timestamp $\tau_e^{[5g]}$ and the reception timestamp $\tau_i^{[5g]}$ in the third time base $t^{[5g]}$.

The second translation unit 232 then transmits the second FollowUp message 226 comprising the time of transmission $\tau_1$ of the first synchronization message 215 in the first time base $t^{[210]}$ as "supposed" time of transmission of the second Sync message in the first time base $t^{[210]}$ and the second correction field value $t_{cf,b}^{[a]}$. Following reception of this FollowUp message 226, the clock 221a of the network subscriber 221 can be synchronized to the master clock 211a of the global timer 211 of the first network 210.

The present method therefore involves only one synchronization message 235 being communicated via the 5G mobile radio network, which synchronization message contains all of the synchronization-relevant data that are needed for synchronizing the two networks 210, 220 to one another. In contrast to conventional synchronization mechanisms such as the "Precision Time Protocol", a multiplicity of messages are therefore not sent, but rather only one message 235. The synchronization message 235 has a smaller total size than the synchronization message pairs as part of the PTP. The volume of data sent for the synchronization via the 5G mobile radio network 230, and therefore the transmission resources of the mobile radio network 230 that are needed for the synchronization, can therefore be reduced and kept as low as possible. Furthermore, complexity for scheduling can be reduced and the synchronization is less susceptible to the loss of data packets.

Figure 3:
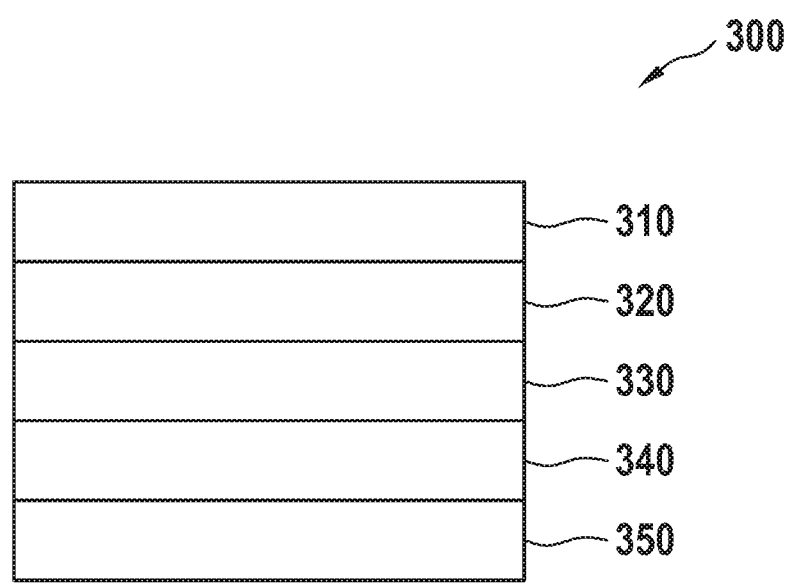
FIG. 3 schematically shows a preferred refinement of a dataset according to the disclosure that can be based on a preferred embodiment of a method according to the disclosure.

FIG. 3 schematically depicts a corresponding synchronization message, which can be produced by the first translation unit 231 and transmitted via the 5G mobile radio network 230 for synchronization, and denotes it by 300. The message 300 comprises a field 310 for a header and also fields 320, 330, 340, 350 for individual variables of the synchronization-relevant data.

The header 310 has in particular a size of 34 bytes.

By way of example, the field 320 can be provided for the transmission timestamp with reference to the time of transmission $\tau_1$ of the first Sync message 215 and can have a size of 10 bytes.

The field 330 can be provided for the frequency shift and also for the first correction field value $t_{cf,a}^{[a]}$. By way of example, the field 330 has a size of 32 bytes.

Furthermore, the field 340 can be provided for the reception timestamp with reference to the time of reception $\tau_i^{[5g]}$ of the first Sync message 215 and, according to IEEE802.1AS-Rev, can have a size of 10 bytes.

The field 350 is provided for example for the mean transmission delay $$\bar{t}_{pd,a\to b}^{[a]}$$

and can have a size of 12 bytes according to IEEE802.1AS-Rev.

The information of the fields 320 and 330, that is to say the transmission timestamp, the frequency shift and the correction field value, corresponds in particular to the information content of a conventional FollowUp message. In addition to this information, the synchronization message 300 also comprises the data of the fields 340 and 350, that is to say the reception timestamp and the transmission delay.

The fields 310, 320 and 330, at 34 bytes, 10 bytes and 32 bytes, have a total size of 76 bytes, for example, which corresponds to the size $N_{FollowUp}$ of a conventional FollowUp message.

This size $N_{FollowUp}$ of 76 bytes for the fields 310, 320 and 330 and also the size $N_{IngressTimestamp}$ of 10 bytes for the field 340 and the size $N_{MeanPropagationDelay}$ of 12 bytes for the field 350 result in a total size $N_{Sync5g}$ of 98 bytes for the message 300:

$$N_{Sync5g} = N_{FollowUp} + N_{IngressTimestamp} + N_{MeanPropagationDelay} = 98 \text{ bytes}$$

In accordance with the PTP, in particular in accordance with IEEE802.1AS-Rev, a conventional Sync message has a size of $N_{Sync}$=44 bytes and a conventional FollowUp message has a size of $N_{FollowUp}$=76 bytes. A conventional Sync and FollowUp message pair therefore has a total size of $$N_{Sync+FollowUp} = 120 \text{ bytes}$$

Conventionally, neither the Sync message nor the FollowUp message comprises the mean transmission delay or a second timestamp for the reception of the Sync message. If a conventional Sync and FollowUp message pair were to have these data added, a theoretical total size $N'_{Sync+FollowUp}$ would result as follows:

$$N'_{Sync+FollowUp} =$$
$$N_{Sync+FollowUp} + N_{IngressTimestamp} + N_{MeanPropagationDelay} = 142 \text{ bytes}$$

A transmission via Ethernet in accordance with IEEE802.3 furthermore requires an Ethernet header having a size of $N_{Ethernet}$=18 bytes. Taking into consideration this Ethernet header size, the following total sizes are obtained for the synchronization message and for a conventional Sync and FollowUp message pair as outlined above:

$$\hat{N}_{Sync5g} = N_{Sync5g} + N_{Ethernet} = 116 \text{ bytes}$$
$$\hat{N}'_{Sync+FollowUp} = N'_{Sync+FollowUp} + 2 \cdot N_{Ethernet} = 178 \text{ bytes}$$

By using the synchronization-relevant message 300, it is therefore possible to decrease the size of the data sent via the 5G mobile radio network in comparison with a conventional Sync, FollowUp message pair from 178 bytes to 116 bytes, corresponding to a data reduction of approximately 34%. Since, furthermore, only one synchronization message 300 is sent, it is furthermore possible to reduce planning or scheduling complexity for the 5G network.

What is claimed is:

1. A method for synchronizing networks, the method comprising:
setting up a first wired communication system in a first network, the first network including a first plurality of components that communicate via the first wired communication system using a first time base, the first wired communication system being realtime-compatible;
setting up a second wired communication system in a second network, the second network including a second plurality of components that communicate via the second wired communication system using a second time base, the second wired communication system being realtime-compatible;
connecting (i) the first wired communication system of the first network to a wireless communication system via a first translation unit and (ii) the second wired communication system of the second network to the wireless communication system via a second translation unit, the first translation unit and the second translation unit each being configured to translate synchronization-relevant data between the first network and the second network, the wireless communication system being realtime-compatible;
synchronizing the first translation unit and the second translation unit to one another according to a third time base of the wireless communication system independently of the first time base and the second time base;
transmitting a third synchronization message from the first translation unit to the second translation unit; and
determining a transmission time for the third synchronization message from the first translation unit to the second translation unit in the third time base, the transmission time for the third synchronization message being taken into consideration for a synchronization of the second time base to the first time base.

2. The method according to claim 1, the determining the transmission time further comprising:
  determining the transmission time for the third synchronization message from the first translation unit to the second translation unit in the third time base as a difference between a reception time of a first synchronization message from the first network at the first translation unit and a transmission time of a second synchronization message from the second translation unit to the second network.

3. The method according to claim 2, further comprising:
  receiving, with the first translation unit, the first synchronization message in the first network;
  determining, with the first translation unit, the reception time of the first synchronization message in the third time base; and
  transmitting, with the first translation unit, the third synchronization message to the second translation unit, the third synchronization message containing the reception time of the first synchronization message in the third time base.

4. The method according to claim 3 further comprising:
  receiving, with the second translation unit, the third synchronization message containing the reception time of the first synchronization message in the third time base;
  transmitting, with the second translation unit, the second synchronization message to the second network; and
  determining, with the second translation unit, the transmission time of the second synchronization message in the third time base.

5. The method according to claim 4 further comprising one of:
  transmitting, with the second translation unit, the transmission time of the second synchronization message in the third time base to the second network; and
  determining, with the second translation unit, the difference between the reception time of the first synchronization message in the third time base and the transmission time of the second synchronization message in the third time base and transmitting, with the second translation unit, data comprising the difference to the second network.

6. The method according to claim 3, the transmitting the third synchronization message further comprising:
  transmitting the third synchronization message further containing a transmission time of the first synchronization message in the first time base.

7. The method according to claim 6 further comprising:
  transmitting, with the second translation unit, the transmission time of the first synchronization message in the first time base to the second network.

8. The method according to claim 7 further comprising:
  transmitting, with the second translation unit, a second correction field value in the first time base to the second network, the second correction field value being configured to correct a total delay from the transmission time of the first synchronization message to a reception time of the second synchronization message.

9. A method for synchronizing networks, the method comprising:
  setting up a first wired communication system in a first network, the first network including a first plurality of components that communicate via the first wired communication system using a first time base, the first wired communication system being realtime-compatible;
  connecting the first network to a wireless communication system having a third time base via a first translation unit, the first translation unit being configured to translate synchronization-relevant data between networks, the wireless communication system being realtime-compatible;
  receiving, with the first translation unit, the first synchronization message in the first network;
  determining, with the first translation unit, a reception time of the first synchronization message in the third time base;
  transmitting, with the first translation unit, a third synchronization message containing the reception time of the first synchronization message in the third time base to the wireless communication system.

10. The method according to claim 9, the transmitting the third synchronization message further comprising:
  transmitting the third synchronization message further containing a transmission time of the first synchronization message in the first time base.

11. A method for synchronizing networks, the method comprising:
  setting up a second wired communication system in a second network, the second network including a second plurality of components that communicate via the second wired communication system using a second time base, the second wired communication system being realtime-compatible;
  connecting the second network to a wireless communication system having a third time base via a second translation unit, the second translation unit being configured to translate synchronization-relevant data between networks, the wireless communication system being realtime-compatible;
  receiving, with the second translation unit, from the wireless communication system, a third synchronization message containing a reception time of a first synchronization message in the third time base;
  transmitting, with the second translation unit, a second synchronization message to the second network;
  determining, with the second translation unit, a transmission time of the second synchronization message in the third time base; and
  one of:
    transmitting, with the second translation unit, the transmission time of the second synchronization message in the third time base to the second network; and
    determining, with the second translation unit, the difference between the reception time of the first synchronization message in the third time base and the transmission time of the second synchronization message in the third time base and transmitting, with the second translation unit, data comprising the difference to the second network.

12. The method according to claim 11 further comprising:
  transmitting, with the second translation unit, a transmission time of the first synchronization message in a first time base to the second network.

13. The method according to claim 12 further comprising:
  transmitting, with the second translation unit, a second correction field value in the first time base to the second network, the second correction field value being configured to correct a total delay from the transmission time of the first synchronization message to a reception time of the second synchronization message.

14. The method according to claim 1, the transmitting the third synchronization message further comprising:

transmitting the third synchronization message containing synchronization-relevant data, the synchronization-relevant data being at least one of (i) a reception time, in the third time base, of a first synchronization message from the first network at the first translation unit, (ii) a transmission time, in the first time base, of the first synchronization message, (iii) a frequency shift, in the first time base, between the first translation unit and a timer of the first network, (iv) a transmission delay, in the first time base, in the first network, and (v) a first correction field value in the first time base, the first correction field value being configured to correct a time delay between the transmission time of the first synchronization message and the reception time of the first synchronization message.

15. The method according to claim 14, the transmitting the third synchronization message further comprising:
transmitting the third synchronization message further containing a header and a respective field for the synchronization-relevant data.

16. The method according to claim 1, wherein at least one of:
the first wired communication system and the second wired communication system are each based on a wired communication standard; and
the wireless communication system is at least one of (i) a realtime-compatible mobile radio network and (ii) based on a wireless communication standard.

17. The method according to claim 1, the transmitting the third synchronization message further comprising:
transmitting the third synchronization message including a dataset, the dataset has a field for a header and fields for individual synchronization-relevant data.

18. The method according to claim 17, wherein dataset has fields for individual synchronization-relevant data including (i) a reception time, in the third time base, of a first synchronization message from the first network at the first translation unit, (ii) a transmission time, in the first time base, of the first synchronization message, (iii) a frequency shift, in the first time base, between the first translation unit and a timer of the first network, (iv) a transmission delay, in the first time base, in the first network, and (v) a first correction field value in the first time base, the first correction field value being configured to correct a time delay between the transmission time of the first synchronization message and the reception time of the first synchronization message.

19. The method according to claim 1, wherein the method is performed by at least one computer.

20. The method according to claim 19, wherein the at least one computer performs the method by executing at least one computer program stored on at least one machine-readable storage medium.

* * * * *